United States Patent [19]
Sullivan et al.

[11] Patent Number: 6,155,072
[45] Date of Patent: Dec. 5, 2000

[54] SNAP ON DESICCANT BAG

[75] Inventors: Stephen F. Sullivan, Boardman, Ohio; Kevin Goulet, Milford, Mich.

[73] Assignees: Ford Motor Company, Dearborn, Mich.; Stanhope Products Co., Brookville, Ohio

[21] Appl. No.: 09/167,352

[22] Filed: Oct. 6, 1998

[51] Int. Cl.[7] ............................................. F25B 43/00
[52] U.S. Cl. ............................................. 62/474; 96/147
[58] Field of Search ........................... 62/298, 474, 475, 62/503; 55/515; 96/108, 133, 147

[56] References Cited

U.S. PATENT DOCUMENTS

| | | | |
|---|---|---|---|
| 3,799,352 | 3/1974 | McClive | 210/282 |
| 3,879,292 | 4/1975 | McClive | 210/282 |
| 4,116,649 | 9/1978 | Cullen et al. | 55/387 |
| 4,291,548 | 9/1981 | Livesay | 62/503 |
| 4,401,447 | 8/1983 | Huber | 55/387 |
| 4,405,347 | 9/1983 | Cullen et al. | 55/387 |
| 4,436,623 | 3/1984 | Cullen et al. | 210/282 |
| 4,457,843 | 7/1984 | Cullen et al. | 210/282 |
| 4,464,261 | 8/1984 | Cullen et al. | 210/282 |
| 4,474,035 | 10/1984 | Amin et al. | 62/503 |
| 4,496,378 | 1/1985 | Kish | 55/316 |
| 4,619,673 | 10/1986 | Cullen et al. | 55/387 |
| 4,911,739 | 3/1990 | Cullen et al. | 55/387 |
| 4,994,185 | 2/1991 | Cullen et al. | 210/282 |
| 5,636,525 | 6/1997 | Riemenschneider | 62/474 |
| 5,837,039 | 11/1998 | LeConey et al. | 96/121 |

*Primary Examiner*—William E. Tapolcai
*Attorney, Agent, or Firm*—Biebel & French

[57] ABSTRACT

An adsorbent package is provided for mounting to a filter or bleed nipple that is, in turn, attached to a bight tube or other fluid flow conduit in an auto or truck refrigerant accumulator or receiver-dryer. In a preferred form of the invention, a centrally disposed opening is provided in the adsorbent package and is surrounded by a rigid collar. The opening is dimensioned so that it will be force or snap fit over a flange or the like on the filter. Fluid flow passages are provided adjacent the opening to ensure free flow of liquid refrigerant and compressor lubricating oil through the filter into the fluid flow conduit.

7 Claims, 6 Drawing Sheets

SNAP ON DESICCANT BAG

BACKGROUND OF THE INVENTION

1. Field of the Invention

The present application pertains to an adsorbent package adapted for use in air conditioning accumulators and receiver dryers of the type having a refrigerant fluid flow line disposed therein that is connected to a filter or bleed nipple.

2. Background of the Invention

Adsorbent packages are typically provided in automotive accumulators and receivers to dehydrate air and refrigerants. Commonly, liquid accumulators for air conditioning systems, such as automotive air conditioning systems, include a sealed or closed canister which provides temporary storage for the refrigerant and a compressor lubricating oil, and also provide for dehydration of the refrigerant. Typically, the liquid accumulator has a permanently sealed casing that includes a baffle which separates the liquid from the gas component, a sump in the container bottom for the accumulation of liquid refrigerant and lubricating oil, and a generally U-shaped pick up tube or suction tube with a bight portion which has a filtered bleed opening facing the sump. The tube also has two legs that extend upwardly toward the baffle at the top in generally, but not necessarily, parallel relationship, one end of which is open to receive an inflow of vaporized refrigerant for delivery to the suction side of the compressor by downward flow past the bottom pick up opening.

One or more desiccant packages are normally carried on or mounted on this U-shaped tube with portions extending from the filtered pick up opening upwardly along the generally parallel leg portions of the tube extending from the bight portion. The desiccant package is inserted and sealed within the accumulator prior to its permanent assembly. Accumulators of this general kind are shown in the U.S. Pat, Nos. of Livesay, 4,291,548 of Sep. 29, 1981, and Kisch 4,496,378 of Jan. 29, 1985. In some cases, the adsorbent package is mounted directly to the filter.

In many current accumulator structures, the filter is provided as part of a plastic snap on assembly wherein a mounting ring or clasp grasps the fluid flow tube to provide a mount for the filter. Due to excessive vibration or filling of the desiccant container with fluid during use, the desiccant container can slump or sag into the accumulator sump area, thereby interfering with the uptake of liquid refrigerant and lubricating oil into the bleed nipple. Thus, there is a need in the art to provide an adsorbent package that interferes less with fluid flow through the accumulator and particularly fluid flow through the sump area of the accumulator into the filtered pick up opening.

SUMMARY OF THE INVENTION

The above noted concerns and needs are addressed by the single, unitary adsorbent package in accordance with the invention. Briefly, the adsorbent material package of the present invention comprises a sole elongated pouch or the like adapted for filling with desiccant or other adsorbent medium therein. Preferably, the package is made of a porous, non-woven, polyester material. A snap fit aperture is provided in one end of the package and is surrounded by an annularly-shaped rigid zone defining a heat or ultrasonic seal of the top surface of the package with the bottom package surface to thereby form a rigid reinforcing collar. The package opening is force or snap fit over a flange or the like associated with the bleed filter that is in turn connected to the bight portion of the suction tube of the accumulator. In typical accumulator structures, the bight portion is oriented transversely with respect to the longitudinal axis of the cylindrical housing and connects upwardly extending legs of the fluid flow tube.

A longitudinally disposed seam member is formed along the length of the top or bottom side of the adsorbent pouch. This seam includes a double fabric layer area and may be formed via conventional means such as heat sealing, ultrasonic sealing, or other electronic sealing or fusing means. This longitudinally extending zone provides a reinforced area of the pouch that is adapted for positioning adjacent a ring-like mounting clamp or the like which latter structure is commonly used to detachably mount a plastic filter to the bight portion.

Preliminary indications are that it is best to provide an aperture diameter in the package of from about 0.8–0.9 of the outside diameter of the filter flange.

In one aspect of the invention, fluid flow passages are provided along opposite sides of the snap fit aperture. The fluid flow passages are separated from the snap fit aperture by the intervening rigid, annularly-shaped reinforcing collar.

In another aspect of the invention, a plurality of fluid flow passages are provided about the circumference of the snap fit aperture. The fluid flow passages are contiguous with the snap fit aperture.

The invention will be further described and illustrated in conjunction with the following detailed description and appended drawings.

DETAILED DESCRIPTION OF THE PREFERRED EMBODIMENT

Figure 1:
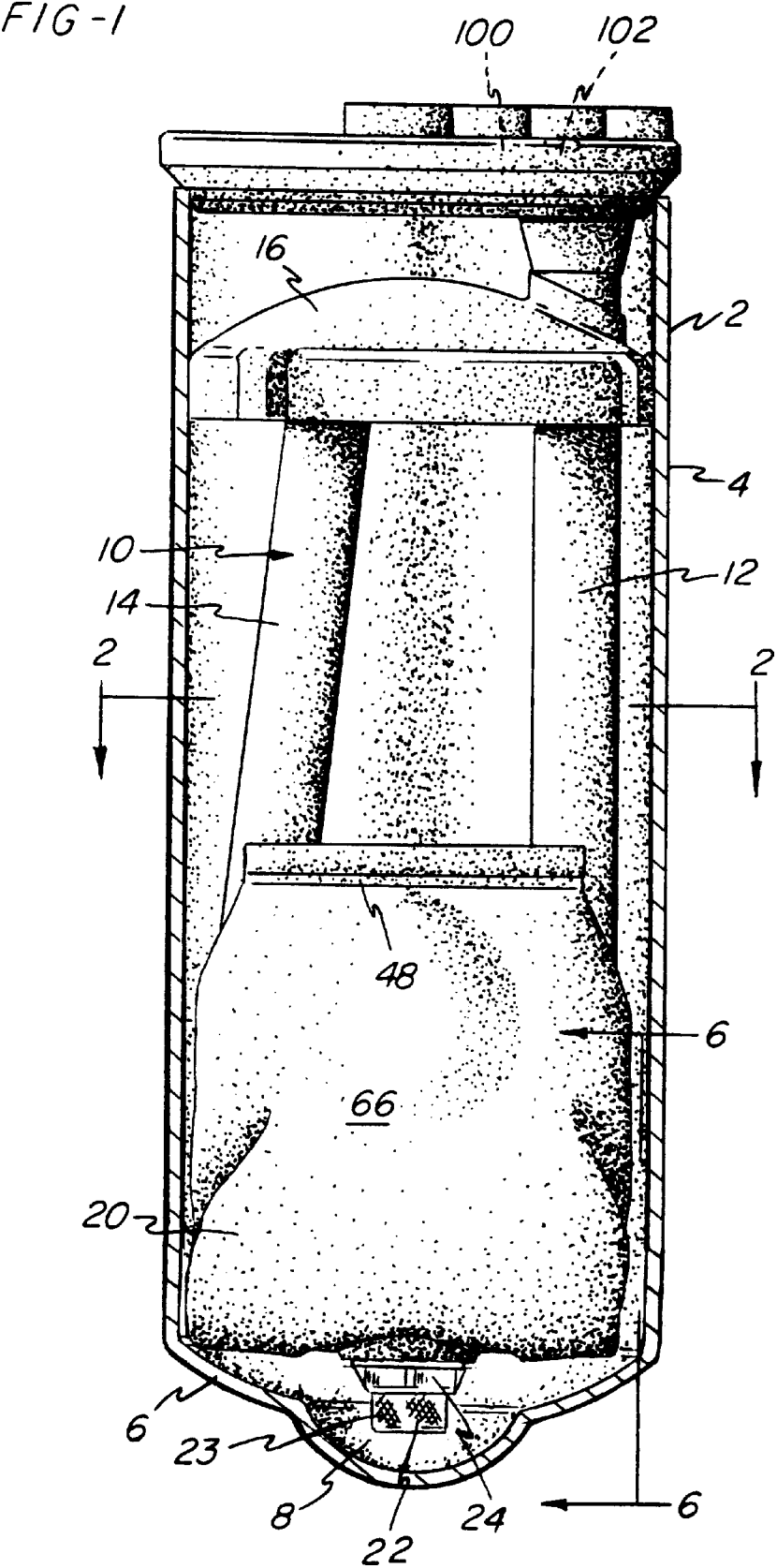
FIG. 1 is a cut away elevational view of an accumulator incorporating a unitary adsorbent material package in accordance with the invention.

Turning first to FIG. 1, there is shown an accumulator 2 of the general type shown and described in U.S. Pat. No.

Figure 2:
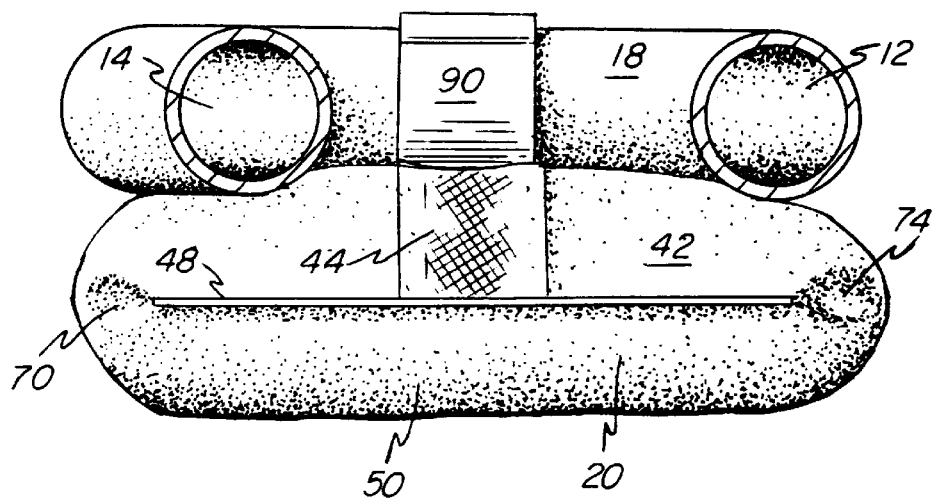
FIG. 2 is a cross-sectional top plan view of the accumulator and adsorbent material package and accumulator fluid flow conduits taken along the plane represented by the lines and arrows 2—2 of FIG. 1.

4,474,035, the disclosure of which is incorporated by reference herein. The accumulator comprises a generally cylindrical housing 4 having a bottom wall 6 leading to a sump area 8. A fluid flow tube 10 having upstanding fluid flow tube legs 12, 14, is provided in the accumulator 2. A baffle 16 shields direct entry to fluid flow tube leg 14 as set forth in the aforementioned '035 patent. The fluid flow tube legs 12, 14, are connected via a transversely oriented bight tube portion 18 (see FIGS. 2 and 6).

As per typical operation, an inlet bore 100 is in communication with an outlet conduit from an evaporator or the like (not shown), with an outlet bore 102 and communicating fluid flow conduit 12 communicating with a suction or inlet side of a compressor unit.

As shown, an adsorbent packet 20 is provided toward the bottom of the accumulator 2, but does not extend into the sump area 8. In accordance with normal operation, the adsorbent package 20 comprises desiccant or the like material therein that is adapted to dehydrate the fluid medium flowing through the accumulator 2. Also, a small amount of lubricating oil or the like injected into the system is aspirated into the suction side of the compressor through a bleed filter housing 22 depending from the bight tube 18. The filter comprises a filter medium 23 and support flange 24.

Figure 3:
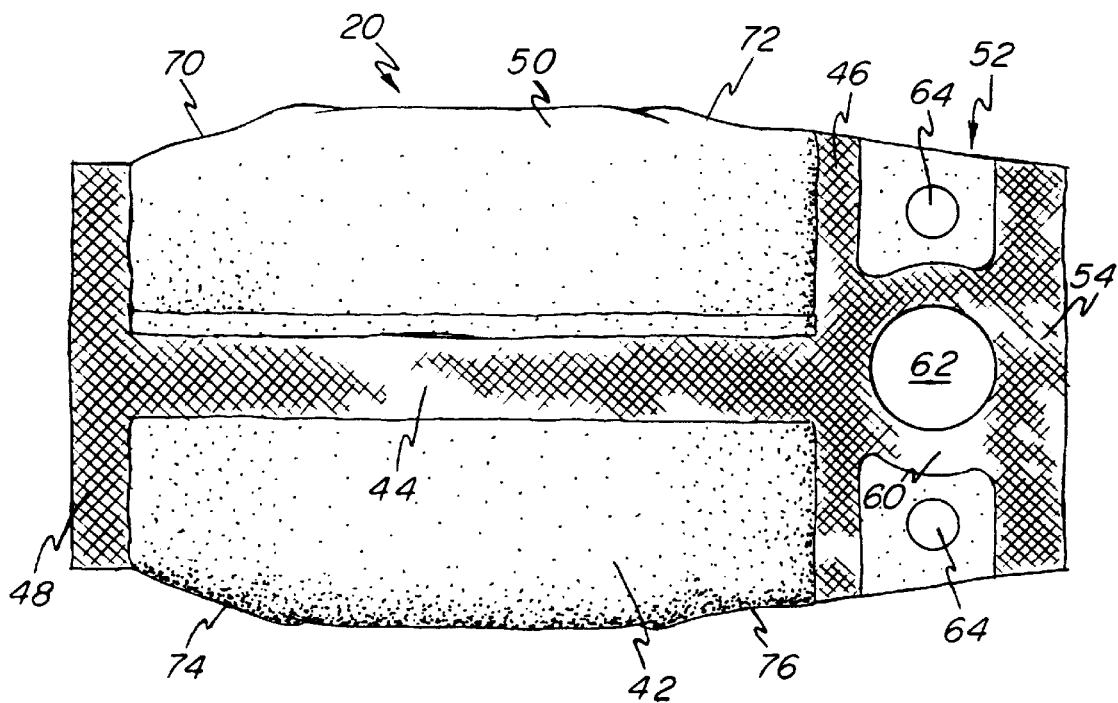
FIG. 3 is a top plan view of an adsorbent material package in accordance with the invention.
Figure 4:
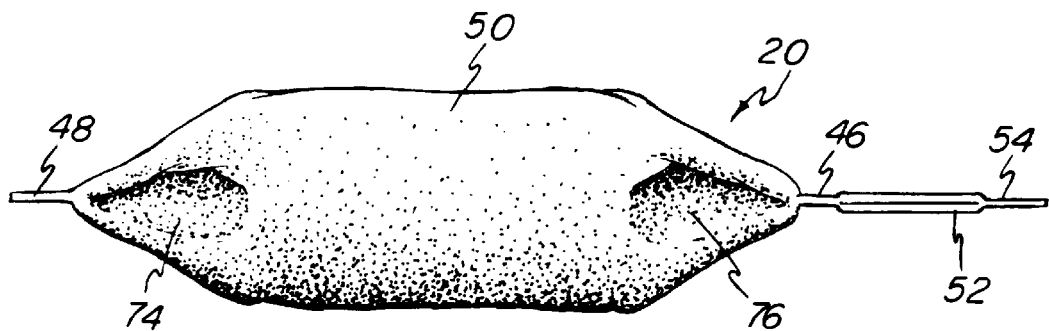
FIG. 4 is an elevational view of the adsorbent material package shown in FIG. 3.
Figure 5:
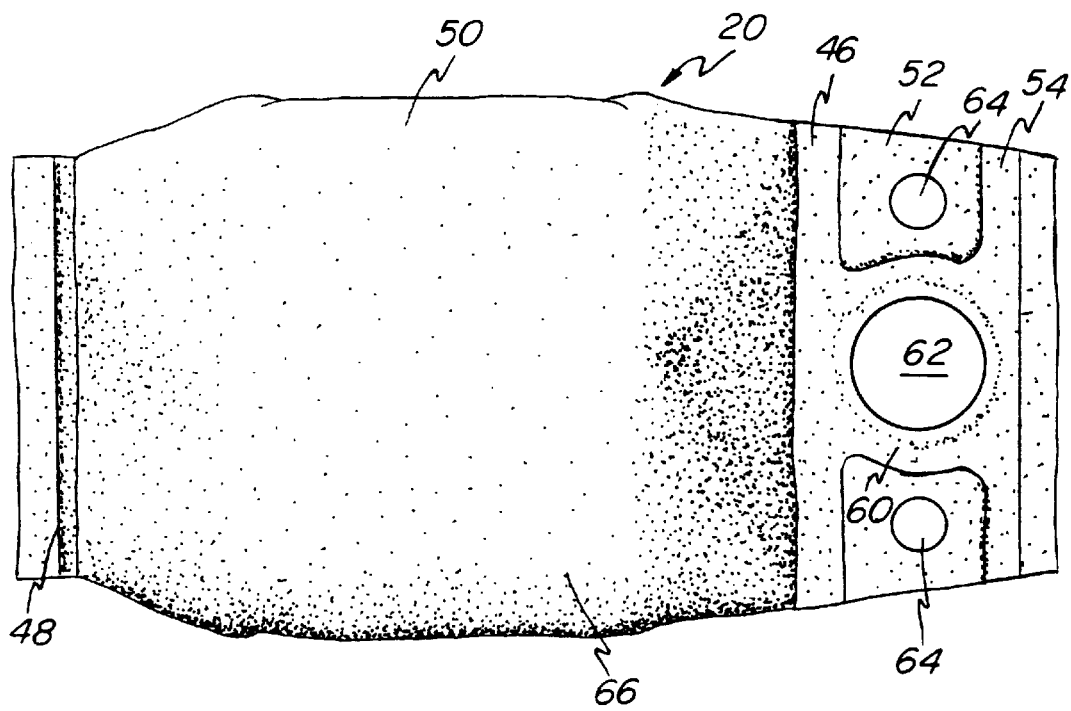
FIG. 5 is a bottom plan view of the adsorbent material package shown in FIG. 3.

Turning now to FIGS. 3 through 5, there is shown an adsorbent packet 20 in accordance with the invention. First, looking at FIG. 3 specifically, the top side or surface 42 of the packet is shown. Here, the elongated packet material comprises pouch end seams 48, 54 sealing the respective longitudinal ends of the package. A longitudinally extending seam 44 extends longitudinally along the length of the elongated packet and slightly laterally offset from a longitudinally extending bisector line extending through the package. This seam 44 provides a double thickness of the felt like material used to form the packet 20 and therefore can be referred to as a reinforcement area. The pouch end seams 48, 54 and the longitudinally extending reinforcement seam 44 define a pouch 50 adapted to contain adsorbent material (not shown) therein.

A mounting zone 52 extends transversely across the longitudinal axis of the pouch 50. The mounting zone is bordered by intermediate seam 46 and end seam 54. Both of these seams may be formed via fusion of the top and bottom fabric surfaces at that pouch area. Intermediate the seams 46, and 54 and positioned along the longitudinally extending centerline or axis is snap fit aperture 62. As shown, the snap fit aperture is surrounded by a reinforcing collar 60, again formed as a fused portion of the top and bottom portions of the packet.

Disposed on either lateral side of the snap fit aperture 62 in the mounting zone 52 are a pair of fluid flow passages 64. These fluid flow passages 64 serve as fluid flow channel means in the mounting zone to permit fluid flow circulation through the zone, and, accordingly, from the upper reaches of the housing 4 through the sump 8. In this manner, fluid and lubricating oil in the sump can be more readily aspirated through the filter 22. This is advantageous since in some of the prior art designs, thickened fabric or seam location across the accumulator at the top of the sump area impeded proper fluid flow migration. While two fluid flow passages 64 are shown, only one may be provided. Alternatively, a plurality of fluid flow passages 64 may be provided.

Although a generally circular mounting aperture 62 is shown in the drawings, the aperture 62 may comprise any one of a myriad of possible cross-sectional shapes such as a rectangle, triangle, parallelogram, rhombus, oval, etc. The key criterion is that the aperture 62 should snap or friction fit over the filter support flange 24.

FIG. 5 depicts the bottom side or surface 66 of the packet 20. Here again, aperture 62 is provided with rigid surrounding zone 60. Zone 60 provides a rigid collar which will be snap mounted to the filter support flange 24. The packet is preferably formed from a fibrous, air permeable material such as a synthetic felt material. Polyester felts are presently preferred but other synthetic and natural felts can of course be employed.

Figure 6:
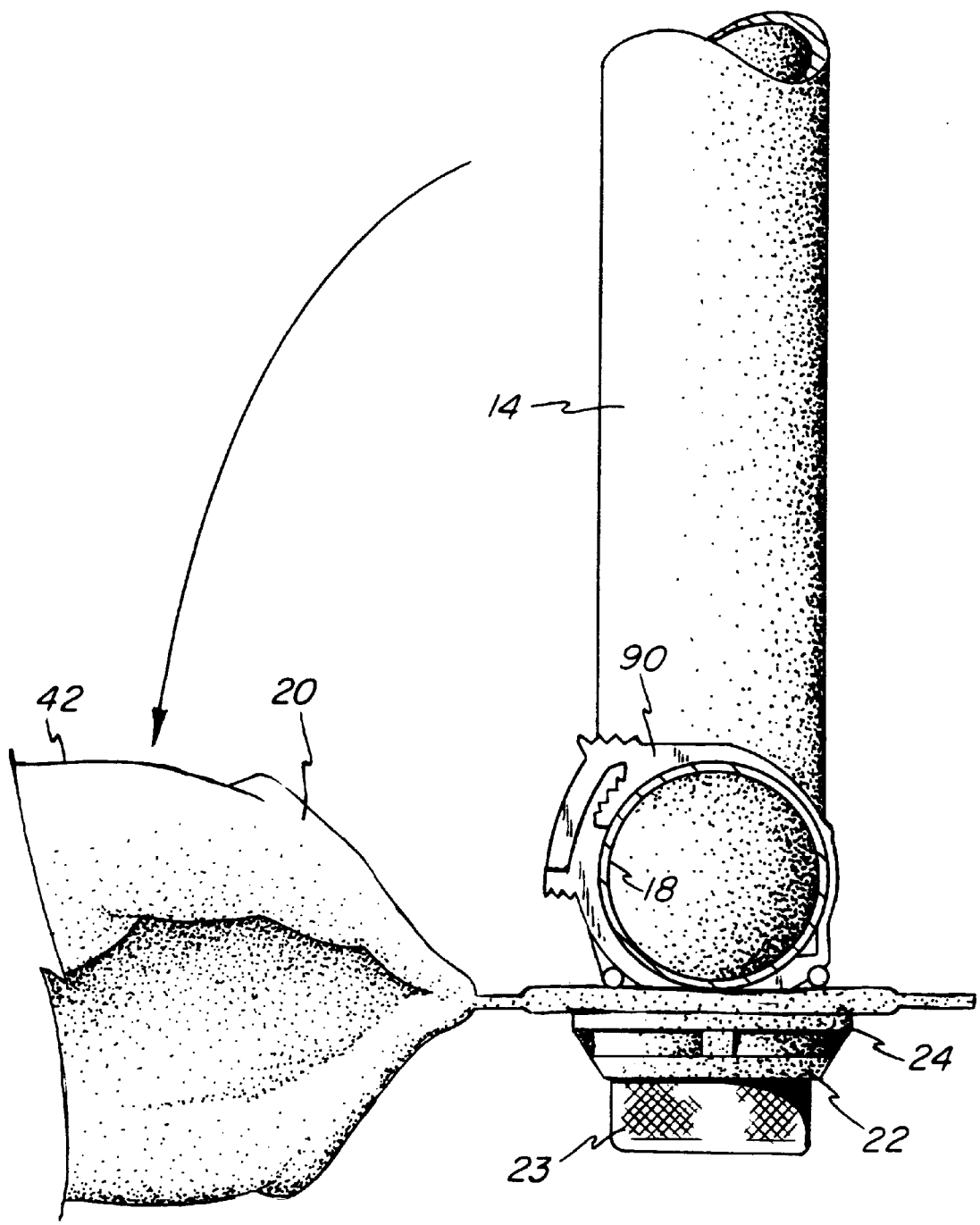
FIG. 6 is a magnified cut away view of the section of the assembly taken along the plane represented by the lines and arrows 6—6 of FIG. 1 with the exception that the lateral end of the package has been moved downwardly as shown by the arrow to better illustrate the mounting of the adsorbent packet over the filter flange.

Turning now to FIG. 6, there is shown bight tube portion 18 with filter housing 22 depending therefrom. The filter is clasped to the bight tube 18 by means of a mounting ring 90 and associated clasp. The aperture 62 is firmly, frictionally received over the support flange 24 of the filter. The top side 42 of the unitary packet 20 will be moved upwardly, against the direction of the arrow, for proper insertion into the accumulator housing 4.

The mounting zone 52, including the rigid collar 60 surrounding the mounting aperture 62, comprises a zone that extends transversely across the width of the packet. This zone provides a rigid, generally flat mounting area for mounting of the bight tube portion 18 thereto. This helps provide stability for the adsorbent package during strenuous use conditions commonly encountered. As can be seen best in FIG. 2, the longitudinal seam 44 is parallel and adjacent to the mounting ring 90 of the filter assembly 22. Due to the rigid nature of the longitudinal seam 44, this helps to provide increased abrasion resistance of the felt packet 20 in a location in which the ring 90 may tend to shear or rub the packet 20.

It is therefore apparent that in accordance with the invention, an opening 62 is provided in the unitary package 20 that is snap fit over the filter housing 22. The opening 62 is surrounded by an annularly shaped collar 60 so as to help maintain stability of the packet over the filter flange 24. Presently, the diameter of the package aperture 62 is formed so that it is about 0.8–0.9 of the diameter of the flange 24. One successfully employed package has provided an aperture 62 diameter of about 0.85–0.86 of the flange 24 outside diameter dimension.

In order to make the packet 20 of the present invention, a tubular felted material, as previously described, is first provided. The bottom of the felted material is then sealed via heat seal, or other electronic sealing system, with ultrasound sealing being preferred, to form a pouch. Then, the desired desiccant is filled into the pouch. Appropriate tucks are made in the pouch by holding the desired pouch portions in place by elongated fingers or the like and ultrasonic sealing of the area. The top longitudinal edge of the pouch is then sealed so as to provide a sealed pouch 50. The transverse end seam 54 and intermediate seam 46 are then formed to define therebetween the mounting zone 52. A fused area comer bonding to solid rigid collar 60 is provided. At the same time, the bottom half of the next succeeding bag in the production run is sealed and the procedure repeated so that successive bags can be made. After each bag 20 is cut, the mounting aperture 62 is cut in the middle of the mounting zone.

Figure 7:
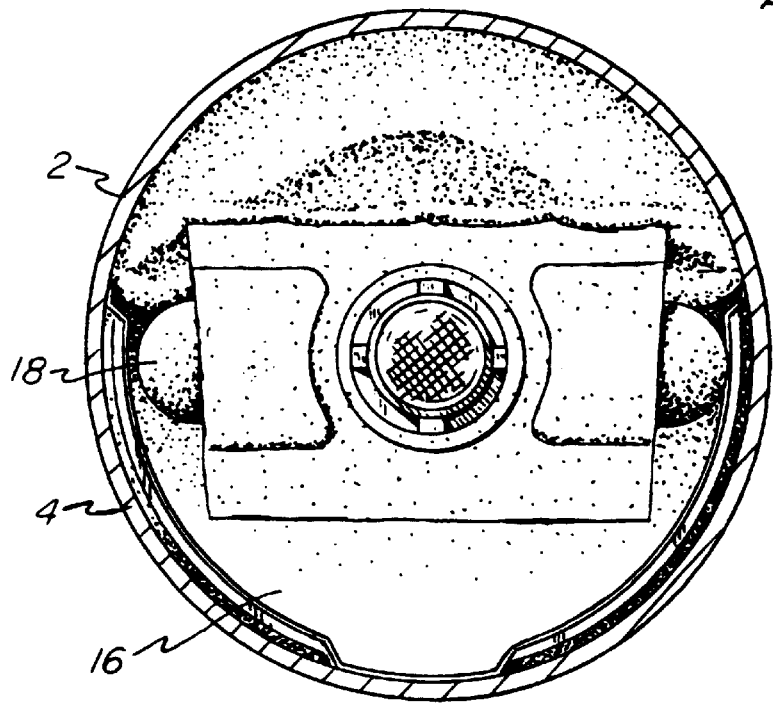
FIG. 7 is a cross-sectional bottom plan view of an accumulator canister showing a prior art adsorbent material package mounted on a bleed nipple therein.

FIG. 7 shows a prior art desiccant container mounted on a bleed filter housing in an accumulator, as seen from the bottom of the accumulator looking upwardly into the accumulator. It will be observed that the mounting flap presents a substantially solid plane transverse to the flow of liquid refrigerant and lubricating oil from the top of the accumulator.

Figure 8:
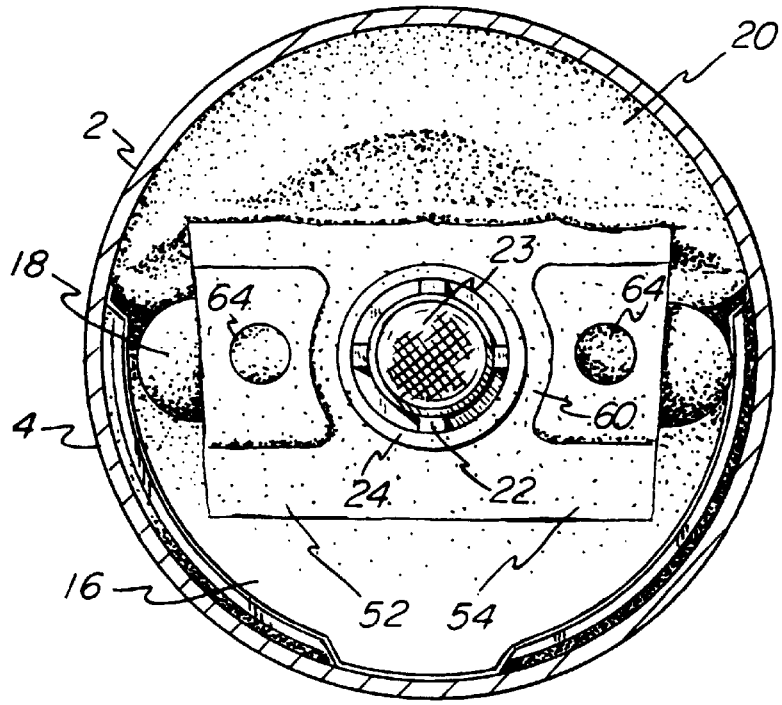
FIG. 8 is a cross-sectional botton plan view similar to FIG. 7 but showing an embodiment of an adsorbent material package in accordance with the invention mounted to a bleed nipple.

In FIG. 8, an embodiment of the present invention is shown and it will be seen therein that the fluid flow passages 64 increase the available cross-sectional surface area for free fluid flow from the top of the accumulator to the sump area. Moreover, the fluid flow passages 64 act like weep or drain holes to prevent the pooling of liquid refrigerant and compressor lubricating oil on top of the mounting zone 52. Thus, the adsorbent material package 20 of the invention interferes less with the free flow of liquid refrigerant and compressor lubricating oil and the like than does prior art desiccant containers.

Figure 9:
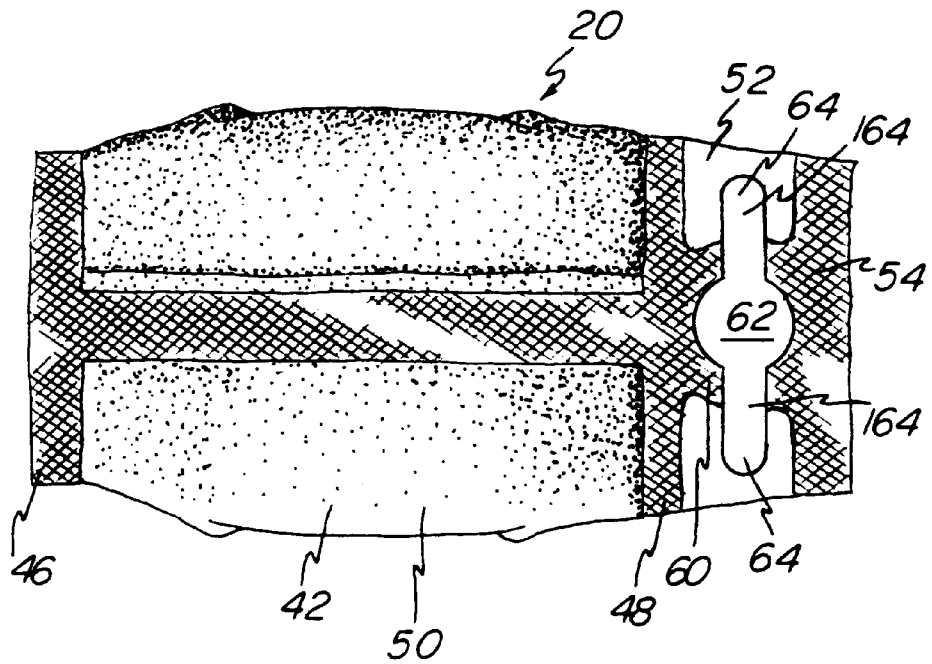
FIG. 9 is a top plan view of another embodiment of an adsorbent material package in accordance with the invention.
Figure 10:
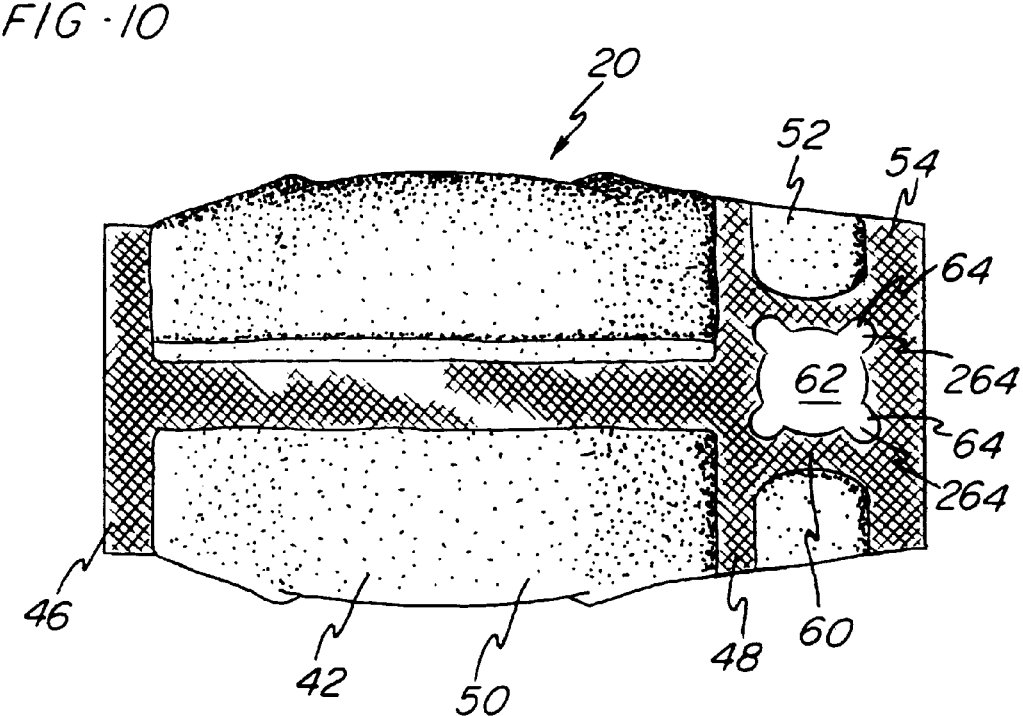
FIG. 10 is a top plan view of another embodiment of an adsorbent material package in accordance with the invention.

Variations on the bag of the type shown in FIG. 3 are shown in FIGS. 9 and 10. Turning first to FIG. 9, the fluid flow passages 64 comprise slots 164 extending laterally from the mounting aperture 62. The slots are contiguous with the opening 62 and located in the mounting zone.

In the embodiment shown in FIG. 15, the fluid flow passages 64 comprise a plurality of scallops or indentations 264 around the inner circumference of the mounting aperture 62.

While the forms of apparatus herein described constitute specific embodiments of this invention, it is to be understood that the invention is not limited to these particular embodiments, and that changes may be made therein without departing from the scope of the invention which is defined in the appended claims.

What is claimed is:

1. An adsorbent containing packet adapted for positioning over a bleed filter or the like attached to a fluid flow conduit, said packet comprising:

an elongated pouch having a longitudinal axis, a top surface and a bottom surface, a longitudinally extending reinforcement member extending along said bottom surface proximate said longitudinal axis, a pair of end seams sealing respective longitudinal ends of said pouch, a mounting zone adjacent from one of said pair of end seams, an aperture located substantially centrally in said mounting zone and dimensioned for snap fit engagement over said filter, and a fluid flow channel in said mounting zone.

2. Adsorbent packet as recited in claim 1 wherein said mounting zone is located between an intermediate seam and one of said end seams, and said reinforcement member interconnects said intermediate seam and said one of said end seams.

3. Adsorbent package for mounting to a tubular structure within an accumulator housing of the type permitting fluid flow therein, said package comprising an elongated pouch having a longitudinal axis, a top surface and a bottom surface, end seams sealing respective ends of said pouch, an intermediate seam formed between said end seams, said intermediate seam together with one of said end seams defining a mounting zone, a reinforcement member extending along said bottom surface between said intermediate seam and said one of said end seams, said reinforcement member positioned proximate said longitudinal axis, mounting means disposed in said mounting zone for attaching said package to said tubular structure, and fluid flow channel means formed in said mounting zone for permitting fluid flow through said zone.

4. Adsorbent package as recited in claim 3 wherein said fluid flow channel means comprise a pair of apertures.

5. Adsorbent package as recited in claim 3 wherein said fluid flow channel means comprise a pair of elongated slots.

6. Adsorbent package as recited in claim 3 wherein said mounting means comprises a snap fit aperture adapted for snap fitting over said tube.

7. Adsorbent package as recited in claim 6 wherein said fluid flow channel means surround and are contiguous to said snap fit aperture.

* * * * *